(12) United States Patent
Vogler

(10) Patent No.: US 6,819,698 B1
(45) Date of Patent: Nov. 16, 2004

(54) ENERGY MONITOR FOR F2 MOLECULAR FLUORINE LASER AND METHOD OF ENERGY STABILIZATION

(75) Inventor: Klaus Vogler, Göttingen (DE)

(73) Assignee: Lambda Physik AG, Goettingen (DE)

( * ) Notice: Subject to any disclaimer, the term of this patent is extended or adjusted under 35 U.S.C. 154(b) by 0 days.

(21) Appl. No.: 09/512,417

(22) Filed: Feb. 24, 2000

Related U.S. Application Data

(60) Provisional application No. 60/122,145, filed on Feb. 26, 1999.

(51) Int. Cl.$^7$ ................................................. H01S 3/22
(52) U.S. Cl. .............................. 372/55; 372/57; 372/58; 372/60
(58) Field of Search ............................... 372/55–58, 60

(56) References Cited

U.S. PATENT DOCUMENTS

| | | | |
|---|---|---|---|
| 6,219,368 B1 * | 4/2001 | Govorkov | 372/59 |
| 6,327,290 B1 * | 12/2001 | Govorkov et al. | 372/61 |
| 6,381,256 B1 * | 4/2002 | Stamm et al. | 372/100 |
| 6,381,257 B1 * | 4/2002 | Ershov et al. | 372/108 |
| 6,442,182 B1 * | 8/2002 | Govorkov et al. | 372/29.021 |
| 6,463,084 B1 * | 10/2002 | Govorkov et al. | 372/9 |
| 6,477,192 B2 * | 11/2002 | Govorkov et al. | 372/57 |
| 6,590,922 B2 * | 7/2003 | Onkels et al. | 372/57 |

OTHER PUBLICATIONS

Sales brochure, Diamond UV Photodetector: High Speed Planar Photoconductor, Centronic Ltd., Electro Optics Division, Croydon, CR9 OBG, England, Feb. 2, 1999.

Sales brochure, Diamond UV Photodetector: High Speed Photoconductor, Centronic Ltd., Electro Otics Division, Croydon, CR9 OBG, England, Feb. 2, 1999.

\* cited by examiner

*Primary Examiner*—Minsun Oh Harvey
*Assistant Examiner*—Delma R. Flores Ruiz
(74) *Attorney, Agent, or Firm*—Stallman & Pollock LLP

(57) ABSTRACT

A molecular fluorine ($F_2$) laser system that includes a gaseous molecular fluorine gain medium contained in a laser tube, a resonant cavity, a power supply for exciting the gain medium to produce a laser beam having an ultra violet (UV) radiation output at substantially 157 nm and a red radiation output in the range of 620 to 760 nm, a discharge module connected to the laser tube for adding and withdrawing gas to the gain medium, a controller for controlling the power supply and the discharge module, and a photo diamond detector that receives a portion of the laser beam for measuring at least one optical parameter of the UV radiation such as energy, pulse energy, pulse shape, pulse width, etc. The photo diamond detector is substantially insensitive to the red radiation output that is also present in the laser beam. The controller modifies the excitation of the gain medium by the power supply, and modifies the gas added to and withdrawn from the gain medium in the laser tube by the discharge module, in response to the optical parameter measured by the photo diamond detector.

15 Claims, 2 Drawing Sheets

ENERGY MONITOR FOR F2 MOLECULAR FLUORINE LASER AND METHOD OF ENERGY STABILIZATION

This application claims the benefit of U.S. Provisional Application No. 60/122,145, filed Feb. 26, 1999, and entitled *Energy Monitor For $F_2$-Excimer Laser And Method Of Energy Stabilization*.

FIELD OF THE INVENTION

The present invention relates to laser operation detection, and more particularly to an energy monitor and method for an $F_2$ molecular fluorine laser system.

BACKGROUND OF THE INVENTION

The present invention relates primarily to the field of industrial molecular fluorine ($F_2$) lasers and the application of $F_2$ lasers in optical lithography, annealing, micro machining, photo-ablation and others. Excimer lasers that are widely used today for these applications include XeCl lasers (308 nm), KrF lasers (248 nm), and ArF lasers (193 mn). However, in the near future, $F_2$ lasers (157 nm) will be more widely used based on their very short wavelength, particularly for such applications as sub-0.18 micron photolithography. The short wavelength photon emission is advantageous for photolithography applications because the critical dimension (CD), which represents the smallest resolvable feature size producible using photolithography, is proportional to the wavelength. The smaller CD permits smaller and faster microprocessors and larger capacity DRAMs in a smaller package. The high 7.9 eV photon emission energy at this low wavelength is also readily absorbed in high band gap materials like quartz, synthetic quartz ($SiO_2$), Teflon (PTFE), and silicone, among others, such that the $F_2$ laser has great potential in a wide variety of material processing applications.

Significant improvements are being made in the development of the $F_2$ laser to achieve an enhanced gain, longer pulse lengths, better pulse-to-pulse stability, and increased lifetime. Some of these improvements are described in U.S. patent application Ser. nos. 09/343,333, 09/317,526, 09/317,527, 09/317,695, and 60/140,530, each of which is assigned to the same assignee and is hereby incorporated by reference into the present application.

For many industrial and laboratory applications, excimer and molecular fluorine ($F_2$) lasers are used in an operating mode that actively regulates and stabilizes the output power of the laser to a preset, configurable power or energy level. The active stabilization typically involves an energy detector that is connected to a control component for driving the high voltage that excites the $F_2$ gas and for operating a gas control system. Accordingly, the driving voltage and gas injections/replenishments are actively adjusted to stabilize the output energy. This is possible because the output energy value depends on the input high voltage and the precise gas mixture in the laser tube. Thus, a variation of output energy may be compensated by adjusting the high voltage and/or laser gas mixture. See U.S. patent applications Ser. nos. 09/379,034, 60/123,928 and 60/124,785 (describing techniques for compensating output energy variations based on halogen depletion including gas replenishment, as well as high voltage adjustments over limited voltage ranges), each of which is assigned to the same assignee as the present invention and which is hereby incorporated by reference into the present application. Fast reliable energy monitors are very important basic modules for the required pulse energy control of the excimer lasers. Most applications of the 193 nm ArF and 248 KrF excimer lasers in optical lithography require energy dose control with high precision pulse-to-pulse regulation.

There are other parameters of the output beam of an excimer laser that require monitoring for various reasons. Among these output beam parameters are beam profile, bandwidth, wavelength, energy stability, pulse shape and pulse duration. In particular, it is desired to monitor any of these parameters in order to provide a feedback mechanism for controlling the laser during operation, particularly when the output beam is being used for precise industrial processing applications such as photolithography of small structures.

The UV laser radiation around 157 nm of the $F_2$-molecule has been observed as being accompanied by further laser radiation output in the red region of the visible spectrum. This visible light originates from the excited fluorine atom (atomic transition). It is desired to have an $F_2$-laser wherein the parameters of the UV (157 nm) portion of the output beam, and in particular the energy, may be monitored without substantial interference due to the accompanying red emission spectrum of the laser.

With the trend of providing lasers with lower and lower wavelengths, monitoring of the output energy, pulse length etc. is increasingly problematic, especially with those laser systems that include visible and/or infrared light accompanying the primary UV output. More specifically, silicon photodiodes have commonly been used as a reliable fast energy monitor for excimer lasers (sometimes with enhanced UV sensitivity or covered by phosphor coatings which down-convert the UV-radiation to the more sensitive visible spectral region of these Si-photodiodes). However, Si-photodiodes have a low spectral response to UV light, while having a significantly higher spectral response to visible and infrared light. Therefore any visible or infrared component in the laser output disproportionately affects the measured output value. This is especially problematic for the $F_2$-laser, which includes red emission between 620 to 760 nm. Another problem with Si-photodiodes is that they degrade quite quickly when exposed to strong UV radiation, which is necessary to achieve a suitable detection level in this region of low detectivity.

Attempts have been made to selectively suppress certain wavelengths emitted from the discharge of the laser tube, especially the parasitic red/infrared laser light of the $F_2$-laser. Because of the lack of suitable cut-off coatings or filters to separate the red radiation from UV on a single pass, a multi-pass beam delivery system has been designed. However, the beam path is very sensitive to mirror misalignment and degradation of the coatings of the many optical beam steering mirrors. Gratings have also been employed to separate red radiation from UV, but again with limited success.

Other types of detectors have been used for UV detection, with limited success. For example, vacuum photodiodes have been employed to measure the UV laser output. However, vacuum photodiodes tend to be cumbersome and expensive, and possess aging sensitive cathode layers. Even if special expensive materials are selected for coating the cathode to match the electron liberation energy to the quantum energy of the photons, they require a high vacuum and high voltage to operate, and therefore are not convenient for electronic signal processing on TTL voltage levels. Thermopiles can easily measure low UV output, but are not fast enough for single pulse detection at high repetition rates.

There is a need for a suitable fast energy detector that is capable of detecting single pulse energies at 157 nm without being adversely affected by associated red radiation, and which is fast enough to permit energy regulation at higher repetition rates without premature degradation due to UV exposure.

SUMMARY OF THE INVENTION

The present invention solves the aforementioned problems by providing an $F_2$ laser system that utilizes a photo diamond detector that measures only the UV radiation in the laser beam. The photo diamond detector is fast enough to measure high pulse energies beyond 1 KHz, without premature degradation from the UV exposure.

The $F_2$ laser system of the present invention includes a molecular fluorine ($F_2$) gain medium disposed in a resonant cavity, a power supply for exciting the gain medium to produce a laser beam having an ultra violet (UV) radiation output at substantially 157 nm and a red radiation output in a 620 to 760 nm wavelength range, and a photo diamond detector that receives a portion of the laser beam for measuring at least one optical parameter of the UV radiation. The photo diamond detector is substantially insensitive to the red radiation output in the laser beam.

In another aspect of the present invention, a method of operating an $F_2$ molecular fluorine laser system having a gain medium disposed in a resonant cavity comprises the steps of exciting a molecular fluorine gain medium to produce a laser beam having an ultra violet (UV) radiation output at substantially 157 nm and a red radiation output in a 620 to 760 nm wavelength range, directing a portion of the laser beam to a photo diamond detector, and measuring at least one optical parameter of the UV radiation using the photo diamond detector. The photo diamond detector is substantially insensitive to the red radiation output in the laser beam.

Other objects and features of the present invention will become apparent by a review of the specification, claims and appended figures.

DETAILED DESCRIPTION OF THE PREFERRED EMBODIMENTS

The present invention is an $F_2$ molecular fluorine laser system 1 that includes a UV sensitive photo diamond detector for active laser system energy detection, regulation and stabilization.

Figure 1:
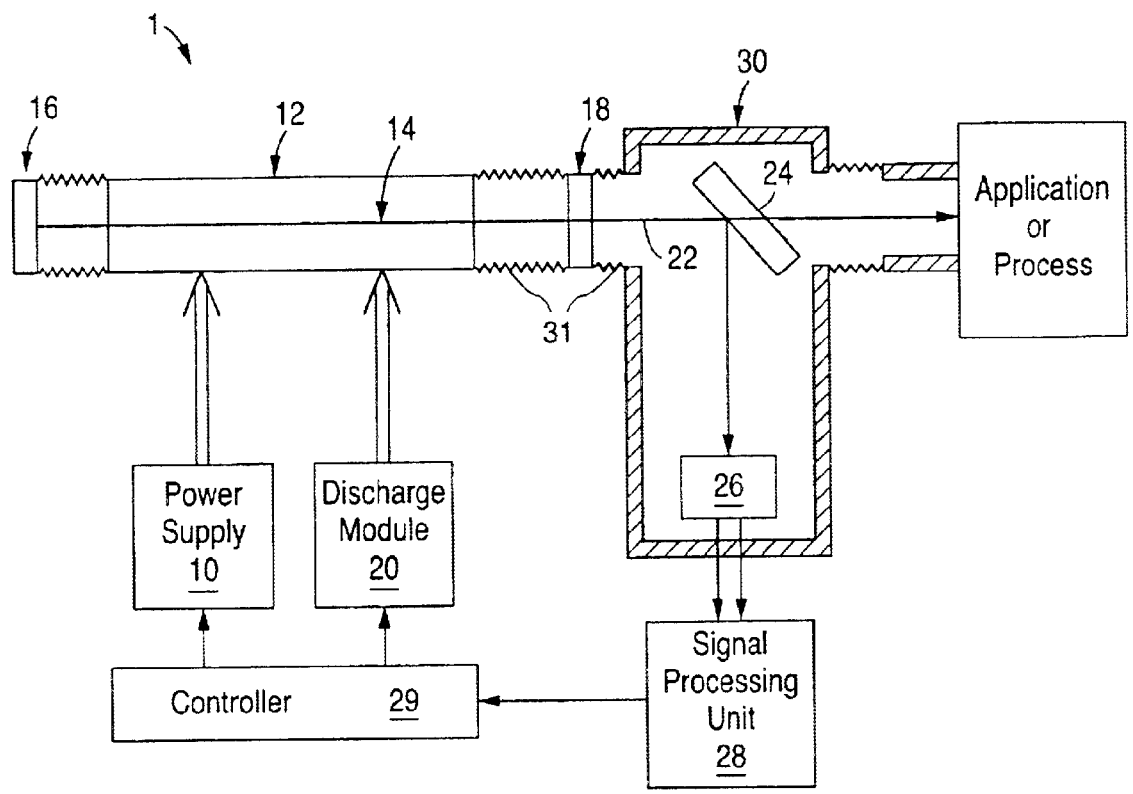
FIG. 1 is an optical/electrical schematic diagram of the $F_2$ molecular fluorine laser according to the present invention.

The $F_2$ laser system 1 is illustrated in FIG. 1, and includes a power supply 10 that excites a molecular fluorine gaseous gain medium within a laser tube 12 to produce a laser beam 14 oscillating inside a resonant cavity (defined by a high reflecting mirror 16 and an output coupling mirror 18). A portion of the oscillating laser beam 14 passes through the output coupling mirror 18 to form an output beam 22 which primarily contains 157 nm radiation but also includes red radiation between 620 to 760 nm as well. A discharge module 20, which is well known in the art, provides the desired pressure and mixture of gases in the laser tube 12 through periodic gas injections and venting. A small portion of the output beam 22 is redirected by a beam splitter 24 to a photo diamond detector assembly 26, which measures various optical parameters of the output beam 22, such as power, pulse energy, energy dose, pulse width, pulse shape, etc. The photo diamond detector assembly 26 has an output connected to a signal processing unit 28, which in turn is connected to a controller 29 that controls the operation of power supply 10 and discharge module 20 in response to the detected output beam parameters measured by the photo diamond detector assembly 26. Signal processing unit 28 and controller 29 are well known in the art for use with silicon detectors, and therefore are not further described in detail here.

The 157 nm UV output is highly absorbed by the atmosphere. Therefore, the output beam 22 is hermetically sealed in a beam enclosure 30 that is purged with an inert gas. Metal bellows 31 also preserve the hermetic seal of the enclosure 30, as well as sealing the mirrors 16/18 to the laser tube 12. The beam splitter 24 is preferably made of an uncoated $CaF_2$ plate, which directs approximately 10% of the output beam 22 to the photo diamond detector assembly 26.

Figure 2:
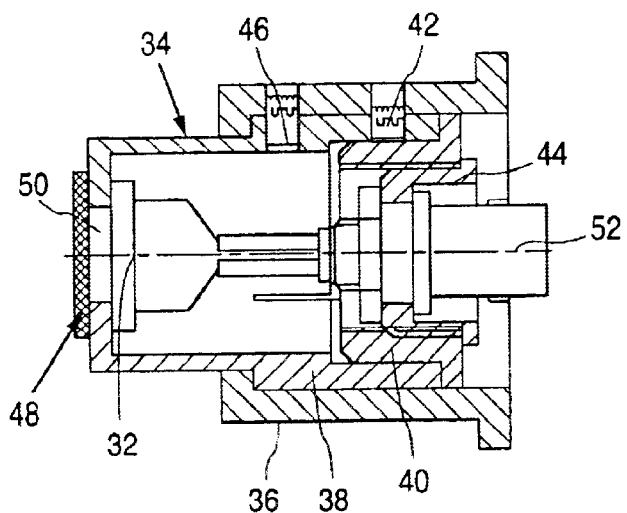
FIG. 2 is a side cross-sectional view of the photo diamond detector assembly of the present invention.

The photo diamond detector assembly 26 of the present invention is best illustrated in FIG. 2, and includes a photo diamond detector 32 mounted inside a sealed housing 34 having various aluminum metal housing parts 36, 38, 40 and seals 42, 44, 46. A stainless steel mesh 48 is mounted over the entrance face of the detector 32 to prevent any EMI disturbance of the detector signal (Faraday cage). The metal mesh 48 can have different mesh wire densities to selectively adjust the transmitted energy. A diffusor plate 50, preferably a scattering $CaF_2$-plate, is also mounted on the entrance face of the detector 10 to diffuse the incoming light, which minimizes beam movement and profile effects on the measured output. Other scattering plates that can be used include plates made from $MgF_2$, quartz or fused silica, and graded LiF. The photo diamond detector 32 is electrically connected to a twin BNC-plug 52 for coupling the signal from detector 32 out of sealed housing 34 and to the signal processing unit 28.

Figure 3:
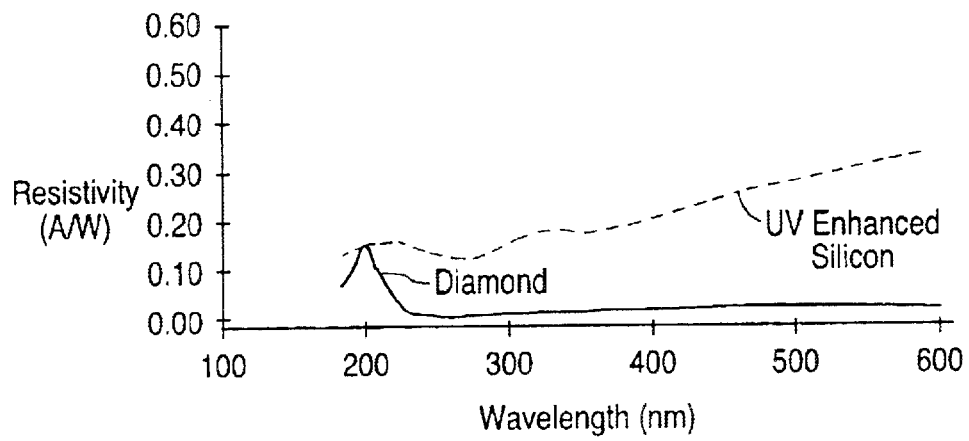
FIG. 3 is graph illustrating the spectral response of a photo diamond detector and a UV enhanced silicon detector.

The photo diamond detector 32 is a photosensitive resistor which is based on the internal photovoltaic effect (i.e. the electron transition between the valence and conduction bands of diamond). Because the bandgap of highly pure crystalline diamond (which is a typical dielectric material) is very large (e.g. >5.5 eV), only photons in the UV range can generate this quantum transition. Therefore the photo diamond detector 32 is naturally solarblind, which means it is basically insensitive for wavelengths greater than about 225 nm. In the preferred embodiment, a specially designed but commercially available diamond UV photo detector from Centronic Ltd. is used. The full sensitivity in the short UV wavelength region is presently not precisely known and is still under investigation. FIG. 3 illustrates the known spectral response of a diamond photosensitive resistor, compared to that of a UV enhanced silicon photodiode. It has been experimentally confirmed that the photo diamond detector still works well at 157 nm wavelength exposure and generates a usable high signal level of over a hundred mV at energy levels below 0.1 mJ or even 0.001 mJ. It was previously unknown whether a diamond based detector would exhibit enough sensitivity and fast enough response time at this low a wavelength.

By using photo diamond detector 32, no special sophisticated means are necessary to suppress the red laser emission which accompanies the 157 nm UV radiation. Thus, a simple beam delivery system can used, and energy monitoring is very convenient and adaptable to regulate and stabilize the operation of the 157 nm $F_2$ laser at a desired pulse energy level.

There are many other advantages of using a photo diamond detector, such as its low thermal sensitivity caused by the very low degree of intrinsic traps. The high damage threshold of this material is relatively high (~1 GW/cm2 at 338 nm). It is also expected that the long term stability of these kinds of photo detectors is orders of magnitude greater than that of common Si-photodiodes or biplanar vacuum photodiodes for 157 nm exposure (even enduring over 1.5 billion laser shots). Because of the photo diamond detector's high thermal conductivity of 20 W/cm K and the very thin photo diamond plates, it is expected that this energy monitor can tolerate high average power levels and therefore would be usable for high repetition rate 157 nm pulse detection. It has been experimentally confirmed that the photo diamond detector can operate at least up to a repetition rate of 1 kHz. Moreover, the linearity of the photo diamond detector is quite good, which is important for a high resolution energy monitor. Even more surprising was the discovery that the response time of the photo diamond detector at 157 nm is much shorter than formerly assumed. Applying the photo diamond detector for direct waveform detection of the 157 nm pulse via oscilloscope has shown its capability to resolve the laser pulse shape and even the internal structure of the 157 nm pulse. Thus the time constant of the detector should be less than 5 ns for laser pulse exposure under 157 nm. The diamond thin-film photo resistor has negligible thermal noise. The dark current is at least smaller by a factor of $10^{-6}$ as compared to the signal at normal room temperature because of the large intrinsic bandgap of diamond. Even more, it is expected that the long-term reliability of the diamond photo resistor is much higher than that of common Si-photodiodes for 157 nm exposure. The photo diamond detector can be used within a vacuum level down to $10^{-6}$ mbar.

Figure 4:
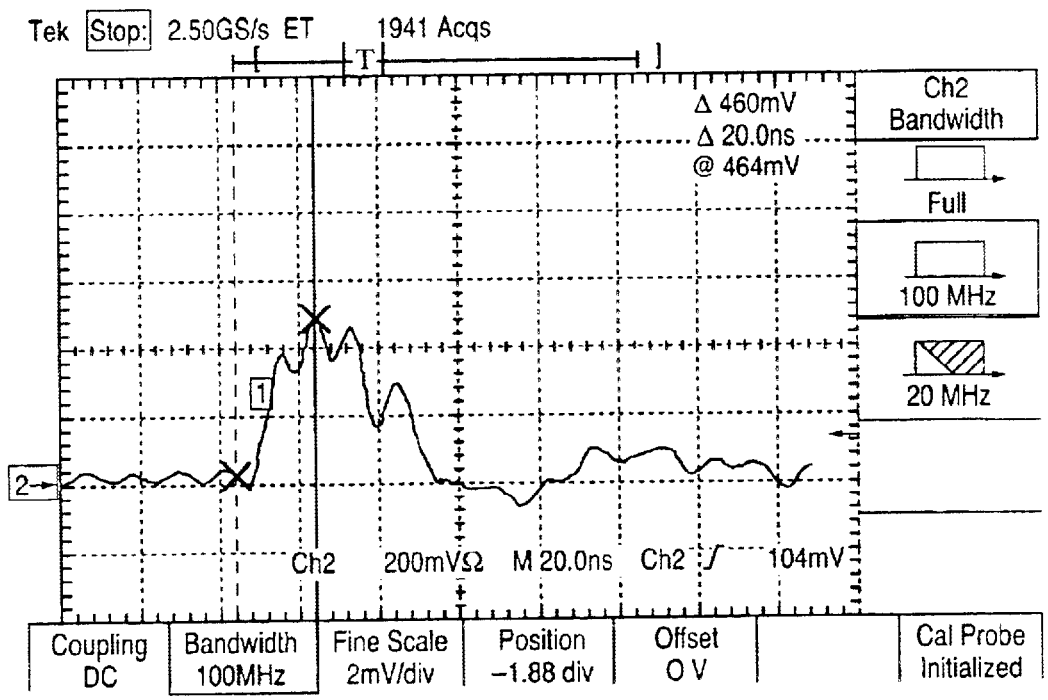
FIG. 4 is a graph illustrating the 157 nm $F_2$ laser pulse shape as measured by the photo diamond detector of the present invention.

FIG. 4 illustrates the 157 nm $F_2$-laser pulse shape as measured by a photo diamond detector and oscilloscope with high time resolution (20 ns/division, 200 mV/div). The waveform is detected at a laser repetition rate of 1 kHz. This demonstrates the unexpected and very surprising result that the photo diamond detector at 157 nm has a very short time constant. The short time constant allows a real time registration of the 157 nm-waveform at suitable high voltage levels with resolution of less than 5 ns (as seen by the resolution of single roundtrips within the waveform).

It is to be understood that the present invention is not limited to the sole embodiment described above and illustrated herein, but encompasses any and all variations falling within the scope of the appended claims. For example, the photo diamond detector could sample a portion of the intracavity laser beam oscillating inside the resonant cavity instead of the output beam exiting from the resonant cavity. Further, controller 29 can be a separate single unit as shown in FIG. 1, or separate components integrally part of power supply 10 and discharge module 20.

What is claimed is:

1. A laser system, comprising:
    a molecular fluorine ($F_2$) gain medium disposed in a resonant cavity;
    a power supply for exciting the gain medium to produce a laser beam having an ultra violet (UV) radiation output at substantially 157 nm and a red radiation output in a 620 to 760 nm wavelength range; and
    a photo diamond detector that receives a portion of the laser beam for measuring at least one optical parameter of the UV radiation;
    wherein the photo diamond detector is substantially insensitive to the red radiation output in the laser beam.

2. The laser system of claim 1, further comprising:
    a controller for controlling the power supply, wherein the controller modifies the excitation of the gain medium by the power supply in response to the optical parameter measured by said photo diamond detector.

3. The laser system of claim 1, further comprising:
    a laser tube for containing the gain medium, wherein the gain medium is gaseous;
    a gas control system connected to the laser tube for adding and withdrawing gas to the gain medium; and
    a controller for controlling The gas control system, wherein the controller modifies the gas added to and withdrawn from the gain medium in the laser tube by the gas control system in response to the optical parameter measured by said photo diamond detector.

4. The laser system of claim 2, further comprising:
    a laser tube for containing the gain medium, wherein the gain medium is gaseous;
    a gas control system connected to the laser rube for adding and withdrawing gas to the gain medium; and
    a controller for controlling the gas control system, wherein the controller modifies the gas added to and withdrawn from the gain medium in the laser tube by the gas control system in response to the optical parameter measured by said photo diamond detector.

5. The laser system of claim 4, wherein the optical parameter is UV radiation energy output, and the controller operates both the power supply and the discharge module to regulate and stabilize the energy output of the UV radiation in response to the UV energy output measured by said photo diamond detector.

6. The laser system of claim 1, wherein the optical parameter is at least one of power level, pulse energy, energy dosage, and pulse waveform.

7. The laser system of claim 2, further comprising:
    a beam splitter disposed in the laser beam to deflect the portion of the laser beam toward the photo diamond detector; and
    a scattering plate disposed in the portion of the laser beam deflected by the beam splitter for diffusing the laser beam portion measured by the photo diamond detector.

8. The laser system of claim 7, further comprising:
    metal mesh shielding disposed at a front face of the photo diamond detector for preventing EMI disturbance to the photo diamond detector.

9. The laser system of claim 8, wherein the metal mesh shielding has different mesh wire densities to adjust transmitted energy to the photo diamond detector.

10. The laser system of claim 1, wherein the photo diamond detector is mounted in a hermetically sealed housing.

11. A method of operating an $F_2$ molecular fluorine laser system having a gain medium disposed in a resonant cavity, comprising the steps of:

exciting a molecular fluorine gain medium to produce a laser beam having an ultra violet (UV) radiation output at substantially 157 nm and a red radiation output in a 620 to 760 nm wavelength range;

directing a portion of the laser beam to a photo diamond detector; and measuring at least one optical parameter of the UV radiation using the photo diamond detector;

wherein the photo diamond detector is substantially insensitive to the red radiation output in the laser beam.

12. The method of claim 11, further comprising the step of:

modifying the excitation of the gain medium in response to the optical parameter measured by said photo diamond detector.

13. The method of claim 1 wherein the gain medium is gaseous and is contained in a laser tube, the method further comprising the step of:

adding and withdrawing gas from the laser tube in response to the optical parameter measured by said photo diamond detector.

14. The method of claim 12, wherein the gain medium is gaseous and is contained in a laser tube, the method further comprising the step of:

adding and withdrawing gas from the laser tube in response to the optical parameter measured by said photo diamond detector.

15. The method of claim 14, wherein the optical parameter is UV radiation energy output, and wherein modifying step and the adding/withdrawing step are performed to regulate and stabilize the UV radiation energy output in response to the UV energy output measured by the photo diamond detector.

* * * * *